May 3, 1960   J. BAUMEL   2,934,999
FOLDABLE STEREOSCOPIC VIEWER
Filed Nov. 17, 1955   2 Sheets-Sheet 1

INVENTOR:
Joseph Baumel
BY:
Michael S. Striker
agt.

May 3, 1960

J. BAUMEL 2,934,999

FOLDABLE STEREOSCOPIC VIEWER

Filed Nov. 17, 1955

INVENTOR:
Joseph Baumel
BY:
Michael S. Striker
agt.

United States Patent Office 2,934,999
Patented May 3, 1960

---

2,934,999

FOLDABLE STEREOSCOPIC VIEWER

Joseph Baumel, Jackson Heights, N.Y.

Application November 17, 1955, Serial No. 547,501

6 Claims. (Cl. 88—29)

The present invention relates to a stereoscope arrangement.

More particularly, the present invention relates to a stereoscope, which may be formed of a single blank, and a stereoscopic film strip capable of being used therewith.

There exists stereoscopes which by means of which two corresponding stereoscopic images carried on a film strip may be viewed so as to give a three dimensional effect. Known stereoscopes are bulky, include a relatively large number of parts, and are expensive to mass produce.

It is therefore an object of the present invention to provide a stereoscope arrangement which overcomes the above disadvantages.

It is another object of the present invention to provide a stereoscope which may be formed of a single blank, which blank may readily be formed into the stereoscope.

It is yet another object of the present invention to provide a stereoscope capable of receiving an unmounted stereoscopic film strip, thereby obviating the necessity of specially mounting the same so as to adapt it for use in a viewer.

The objects of the present invention also include the provision of a stereoscopic film strip which is so arranged that corresponding left and right images may be properly positioned relative to the stereoscope.

It is a still further object of the present invention to provide a stereoscopic film strip which may easily be prepared by existing motion picture processing devices.

With the above objects in view the present invention mainly consists in a stereoscope arrangement which comprises a stereoscope and a stereoscopic film strip. The stereoscope has a top and a bottom wall, and two outer and one intermediate wall means arranged between the top and bottom walls. The intermediate wall means is constituted by a pair of intermediate wall portions in substantially face to face relationship and forming between themselves film strip receiving means for receiving the stereoscopic film strip. The intermediate wall portions are formed with two pairs of opposite frame means so arranged that a left image frame carried by the stereoscopic film strip received in the film strip receiving means is positioned between one of the pairs of frame means and the corresponding right image frame is positioned between the other of the pairs of the frame means. One of the outer wall means is arranged on one side of the intermediate wall means, is spaced therefrom, and is formed with lens receiving means for receiving a pair of lenses in such a manner that corresponding image frames on the stereoscopic film strip received in the receiving means may be viewed simultaneously. The other of the outer wall means is arranged on the opposite side of the intermediate wall means and is spaced therefrom. This other outer wall means and portions of the top and bottom walls immediately there-adjacent each have at least two translucent portions in alignment with the pairs of frame means, respectively.

Also, the present invention consists in an elongated substantially rectangular blank of foldable material which is adapted to be formed into a substantially box-shaped stereoscope.

Moreover, the present invention consists in a stereoscopic film strip having thereon at least a pair of corresponding left and right stereoscopic image frames. The image frames of each pair are separated by at least one image frame of another pair.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
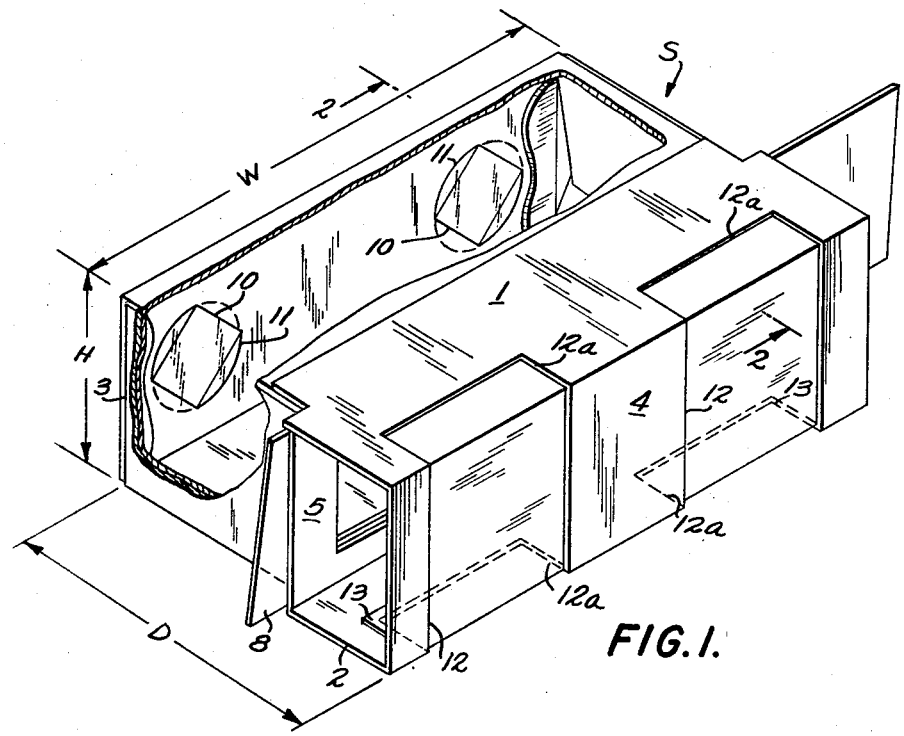
Fig. 1 is a perspective view of a stereoscope according to the present invention.
Figure 2:
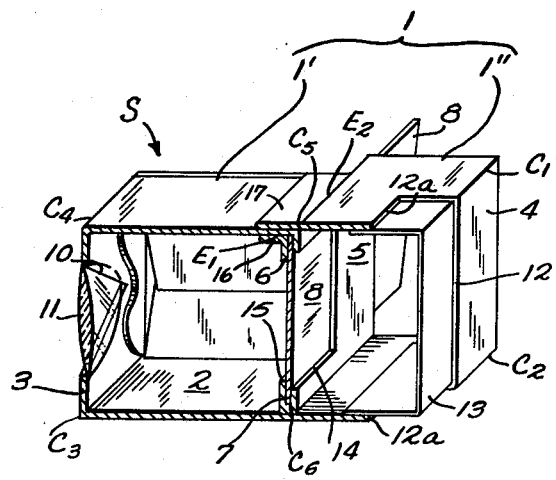
Fig. 2 is a sectional perspective view taken substantially along line 2—2 of Fig. 1.

Referring now to the drawings, and to Figs. 1 and 2 in particular, there is shown a preferred embodiment of a stereoscope apparatus according to the present invention. The stereoscope is substantially box-shaped and has a width W, a height H, and a depth D. The stereoscope has a top wall 1 and a substantially parallel bottom wall 2. First and second outer wall means 3 and 4 and intermediate wall means 5, 6 are arranged between the top and bottom walls 1 and 2. The outer wall means and the intermediate wall means are substantially parallel to each other and hingedly connected to the top and bottom walls in such a manner that the top and bottom walls may be brought toward each other so that the stereoscope may be folded substantially flat.

The outer wall means 3 is formed with a pair of cutout portions 10 which constitute a lens receiving means adapted to receive a pair of lenses 11. The other outer wall means 4 is on the other side of the intermediate walls means 5, 6 and is formed with a pair of cutout portions 12 each of which is covered by a sheet of translucent material 13. If desired, the top and bottom walls 1 and 2 may be formed with cutout portions 12a which are continuations of the cutout portions 12 in the outer wall means 4. These cutout portions 12a may be covered by the same sheet of translucent material 13 as the corresponding cutout portions 12.

The intermediate wall means 5, 6 is constituted by a pair of intermediate wall portions 5 and 6 which are in substantially face to face relationship with each other and form between themselves a stereoscopic film strip receiving means 7 adapted to receive a stereoscopic film strip 8. The stereoscopic film strip 8, preferred embodiments of which will be described below, carries thereon one or more pairs of corresponding left and right stereoscopic image frames, and the intermediate wall portions 5 and 6 are formed with two pairs of cutout portions. Each pair includes a cutout portion 14 formed in intermediate wall portion 5 and a cutout portion 15 formed in intermediate wall portion 6. The two cutout portions together constitute a pair of frame means and the arrangement of the parts is such that a left image frame carried by the stereoscopic film strip 8 is positioned between one of the pairs of frame means and the corresponding right image frame is positioned between the other of the pairs of frame means. As may readily be seen in the drawings, the cutout portions 10, 15, 14 and 12 of each set are in alignment with each other.

It will be clear from the above that a film strip 8 may readily be moved through the film strip receiving means 7, and that the corresponding left and right image frames carried on the film strip 8 may be viewed through the lenses 11 in a manner well known in the art.

If desired, intermediate wall portion 5 may be slightly wider than intermediate wall portion 6. In this way, the inner face of intermediate wall portion 5, i.e., that face thereof which is nearest intermediate wall portion 6, projects beyond the inner face of intermediate wall portion 6 and facilitates the introduction of the film strip 8 into the film strip receiving means 7.

Figure 3:
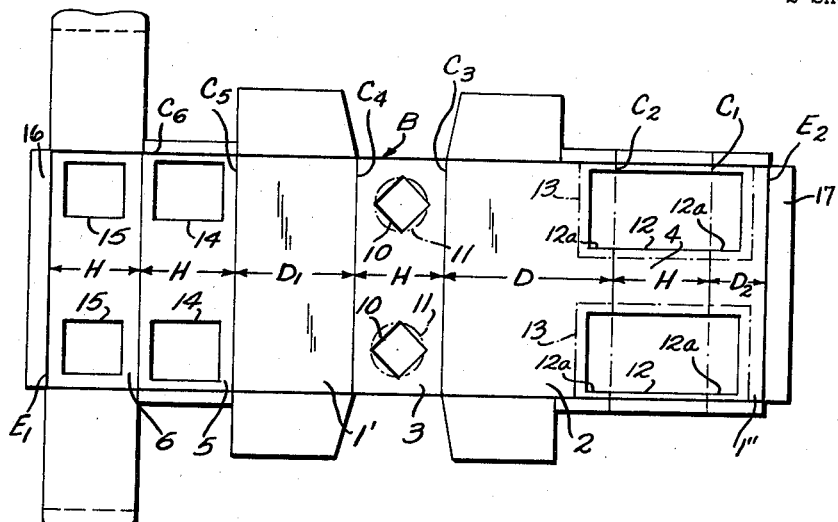
Fig. 3 is a plan view of an unfolded blank adapted to be formed into the stereoscope illustrated in Figs. 1 and 2.

According to the preferred embodiment of the present invention the stereoscope S may be formed of a single blank made of a foldable material, such as cardboard or the like. Fig. 3 is illustrative of a suitable blank B which may be folded into a box-shaped stereoscope S of predetermined height, width and depth, these dimensions being indicated in Fig. 1 as H, W and D, respectively. The blank B is an elongated substantially rectangular one, with the basic outline thereof being shown in heavy lines. The blank B has a width corresponding to the width W of the stereoscope as well as two end edges $E_1$ and $E_2$, and is formed with six consecutive transverse creases $C_1$, $C_2$, $C_3$, $C_4$, $C_5$ and $C_6$ therebetween, constituting first, second, third, fourth, fifth and sixth creases, respectively.

The second and third creases are spaced from each other a first distance which corresponds to the depth D of the stereoscope, and define between themselves the bottom wall 2.

The third and fourth creases are spaced from each other a second distance which corresponds to the height H of the stereoscope, and define between themselves the first outer wall means 3. The latter is formed with the two cutout portions 10 which constitute the lens receiving means and are adapted to receive the lenses 11.

The fourth and fifth creases are spaced from each other a third distance $D_1$ which is smaller than the distance D. The creases define between themselves a part 1' of the top wall 1.

The fifth and sixth creases are spaced the distance H from each other and define between themselves the intermediate wall portion 5, and the sixth crease and the end edge $E_1$ are spaced from each other also the distance H and define between themselves the other intermediate wall portion 6. As is clearly shown in Fig. 3, both intermediate wall portions 5 and 6 are formed with the cutout portions 14 and 15.

The second and first creases are spaced the distance H from each other and define between themselves the outer wall means 4. The same is formed with two cutout portions 12 which are covered by two sheets of translucent material indicated at 13. Thus, part of the outer wall means 4 is translucent.

Finally, the first crease and the end edge $E_2$ are spaced from each other a fourth distance $D_2$ which is equal to the difference between the distances D and $D_1$. The first crease and the end edge $E_2$ define between themselves the remainder 1'' of the top wall 1.

If desired, the bottom wall 2 and the portion 1'' may be formed with cutout portions 12a which are continuations of the cutout portions 12 formed in the outer wall means 4. A common layer of translucent material may be used to cover the composite cutout portion constituted by the cutout portion 12 of the outer wall means 4 and the corresponding cutout portion 12a.

It is evident from the above that the substantially rectangular blank B may be folded so as to assume the configuration shown in Fig. 2. As may readily be seen from that figure, the portions 1' and 1'' formed, respectively, between the fourth and fifth creases and between the first crease and the end edge $E_2$ together constitute the top wall 1.

Suitable fastening means are provided for maintaining the folded blanks in the position shown in Fig. 2. For this purpose, Fig. 3 shows end flaps 16 and 17 provided to extend beyond said opposite end edges $E_1$ and $E_2$, respectively. In the assembly of stereoscope S which in utilizing blank B can be accomplished automatically on existing standard folding and sealing machinery, intermediate wall portions 5 and 6 are folded along crease $C_6$ to lie against each other and flap 16 folded along $E_1$ to lie against the interior surface of top wall portion 1' while flap 17 remains in the plane of top wall portion 1'' and overlays the exterior surface of top wall portion 1', flaps 16 and 17 being adhesively secured in said position to top wall portion 1'. Thus hinged movement between the vertical and horizontal walls is not prevented, so that the top and bottom walls may be brought toward each other and the stereoscope be folded substantially flat.

If desired, the blank B may be formed with flat portions which are shown exteriorly of the rectangle in heavy lines. These flat portions are so arranged as to form side walls of the erected stereoscope.

The above described stereoscope may be used to view an unmounted stereoscopic film strip of the type described below which has thereon corresponding left and right stereoscopic image frames. According to the present invention, such stereoscopic film strips have thereon at least two pairs of corresponding left and right stereoscopic image frames, with the image frames of each pair being separated by at least one image frame of another pair and spaced apart a distance greater than one frame width.

Figure 4:
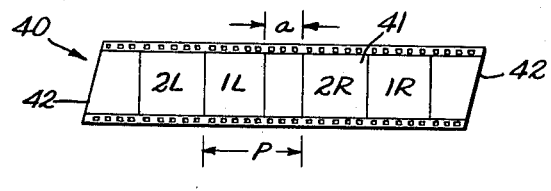
Fig. 4 is a preferred arrangement of a stereoscopic film strip.

Fig. 4 is illustrative of one preferred arrangement of a stereoscopic film strip according to the present invention, and shows a film strip 40 having thereon two pairs of corresponding left and right stereoscopic image frames. The left image frame of pair 1 is indicated by 1L and the right image frame of the same pair is indicated by 1R, the left image frame of pair 2 is indicated by 2L and the right image frame of the same pair is indicated by 2R, etc. The left image frame of both pairs are arranged consecutively in a predetermined sequence and constitute a left series, and the right image frames of both pairs are arranged consecutively in the same predetermined sequence and constitute a right series. The left and right series are arranged consecutively, and the left and right image frames of each pair are so spaced from each other as to be in alignment with the cutouts 14, 15 of the above described stereoscope S. In other words, when the film strip 40 is received in the film strip receiving means 7 of the stereoscope S, the left image frame of one pair is positioned between one pair of cutouts 14, 15 and the right image frame of the same pair is positioned between the other pair of cutouts 14, 15. In order to obtain this result, the left and right series may be spaced from each other a distance $a$, as indicated in Fig. 4.

Figure 5:
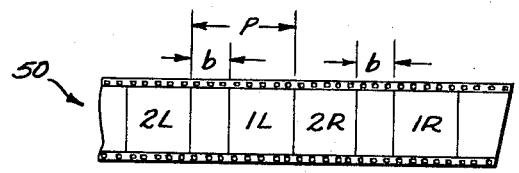
Fig. 5 is another preferred arrangement of a stereoscopic film strip.
Figure 6:
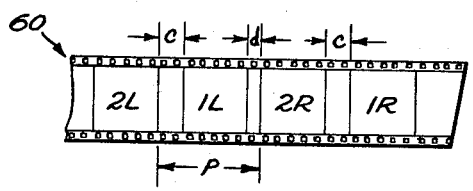
Fig. 6 is yet another preferred arrangement of a stereoscopic film strip.

According to the present invention the film strip is a standard 35 mm. one, and each image frame has a width corresponding to 5 sprocket holes, as is shown in Figs. 4 to 6. It has been found that when the distance $a$ is selected to correspond to 3 holes so that the image frames of each pair are spaced apart a distance P corresponding to 8 holes, the image frames will be so positioned as to be best capable of being viewed stereoscopically. Thus, the cutout portions 14 and 15 are so spaced from each other as to frame two corresponding images which are spaced the distance P from each other.

If desired, the free ends of the film strip 40 may be beveled as shown in 42, thereby facilitating introduction of the film strip into the receiving means 7 of the stereoscope S.

In the embodiment illustrated in Fig. 5, the left and right series are adjacent each other, and the left image frames of the two pairs carried by the film strip 50 are spaced a predetermined distance b from each other, as are the right image frames of the pairs. The distance B corresponds to 3 holes so that the distance P corresponds to 8 holes, as in the above-described embodiment.

Film strip 60 shown in Fig. 6 incorporates the characteristics of the above described embodiments, in that the left image frames of both pairs are spaced from each other a distance c, as are the right image frames, and in that the left and right series are spaced a distance d from each other. The distances c are shown as corresponding to 2 holes and the distance d to 1 hole, but it will be understood that the distances c may correspond to 1 hole and the distance d to 2 holes. In either event, the distance P will correspond to 8 holes, as in the above-described embodiments.

It will be seen from the above that a stereoscopic film strip according to any of the above-described embodiments may readily be inserted into the receiving means 7 of the steroscope S without it being necessary to mount the strip in any way.

It will be understood that each of the elements described above, or two or more together, may also find a useful application in other types of stereoscope arrangements differing from the types described above.

While the invention has been illustrated and described as embodied in a stereoscope and stereoscopic film strip therefore, which stereoscope may be constructed from a single blank, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An elongated substantially rectangular blank of foldable material adapted to be formed into a substantially box-shaped stereoscope of predetermined height, width and length, said blank having a width corresponding to the width of said stereoscope and being formed with two end edges and six consecutive transverse creases therebetween, the second and third creases being spaced from each other a first distance corresponding to the depth of said stereoscope and defining between themselves a bottom wall portion, the third and fourth creases being spaced from each other a second distance corresponding to the height of said stereoscope and defining between themselves a first outer wall portion formed with lens receiving means for receiving a pair of lenses, the fourth and fifth creases being spaced from each other a third distance smaller than said first distance and defining between themselves part of a top wall portion substantially equal in area to said bottom wall portion, the fifth and sixth creases being spaced said second distance from each other and defining between themselves a first intermediate wall portion, the sixth crease and one of said end edges being spaced said second distance from each other and defining between themselves a second intermediate wall portion, said intermediate wall portions being adapted to be folded upon each other in substantially face-to-face relationship in such a manner as to form a film strip receiving means between themselves for receiving a stereoscopic film strip, said wall portions being formed with two pairs of opposite frame means so arranged that a left image frame carried by a stereoscopic film strip received in said film strip receiving means is positioned between one of said pairs of frame means and the corresponding right image frame is poistioned between the other of said pairs of frame means, said pairs of frame means being respectively in alignment with a pair of lenses received by said lens receiving means, the second and first creases being spaced said second distance from each other and defining between themselves a second outer wall portion at least a part of which is translucent, and the first crease and the other of said end edges being spaced from each other a fourth distance equal to the difference between said first and third distances and defining between themselves the remainder of said top wall portion.

2. An elongated blank of foldable material adapted to be formed into a substantially box-shaped viewer, said blank having two opposite end flaps and six panels defined by seven parallel transverse folds, a first and second of said panels adjacent a first of said end flaps each having cutout portions forming a picture framing means and being adapted to be folded against each other in face-to-face relation to form a film receiving means therebetween, a third of said panels adjacent said first and second panels forming a top forward wall portion of said viewer, said first end flap being adapted to be folded to lie against an inner side of said top forward wall portion for securing thereto, a fourth of said panels adjacent said third panel having a cutout for mounting a lens and forming a front wall of said viewer, the fifth of said panels adjacent said fourth panel being of a width greater than said third panel and forming the entire bottom wall panel of said viewer, the sixth of said panels between said fifth panel and the other of said end flaps having a relatively large window fitted with translucent pane material and forming a rear wall of said viewer, said other end flap being wider than said first end flap adapted when folded to partially overlie said top forward wall portion for securing thereto and to form the remainder of the top wall of said box-shaped viewer.

3. The elongated blank defined in claim 2 in which said box-shaped viewer is sized for stereoscopic use and said cutout portions forming said picture framing means in said first and second panels, said cutout lens mounting means in said fourth panel and said window fitted with translucent pane material in said sixth panel are all formed in pairs properly spaced for stereoscopic viewing.

4. A viewer of the character described formed of sheet cardboard material folded along a plurality of transverse fold lines into a box structure having top, bottom, front and rear exterior walls and a pair of interior walls extending substantially parallel to said front and rear walls and spaced therefrom, said interior walls forming a film positioning means therebetween, said front wall having a cutout mounting a lens, said rear wall having a relatively large window fitted with translucent pane material in alignment with said lens cutout, said interior walls having aligned cutout windows for centering a film objective to be viewed in alignment with said lens cutout and rear wall window, said box structure being collapsible into a flattened configuration with the interior walls folded between adjacent pairs of said exterior walls, side closure panels extending laterally from one side of said interior walls folded forwardly to form side closure walls serving to retain said box structure in an erect operative position, opposite ends of said blank having extension end flaps adhesively sealing the blank into said collapsible structure, one of said end flaps being an extension of one of said interior walls and secured to an inner surface portion of said top wall, the other of said end flaps extending from said rear exterior wall and secured to an exterior surface portion of said top wall.

5. The viewer as defined in claim 4 in which said rear wall window extends into adjacent portions of said top and bottom walls.

6. A viewer of the character described formed from a blank of foldable sheet material scored and folded along a plurality of transverse folds into a collapsible box structure having top, bottom, front and rear exterior walls and a pair of interior walls extending substantially parallel to said front and rear walls and spaced therefrom, said blank having two opposite end flaps and six panels, a first and second of said panels adjacent a first of said end flaps each having cutout portions forming a picture framing means and being folded against each other in face-to-face relation as said pair of interior walls forming a film receiving means therebetween, a third of said panels adjacent said second panel forming a forward portion of said top wall, said first end flap being secured to an inner side of said top wall forward portion, a fourth of said panels adjacent said third panel having a cutout mounting a lens thereover forming said front wall, a fifth of said panels adjacent said fourth panel being of a width greater than said third panel forming said bottom wall, the sixth of said panels between said fifth panel and the other of said end flaps having a relatively large window fitted with translucent pane material forming said rear wall, said other end flap being wider than the first end flap forming the remainder of the top wall and extending to partially overlie and being secured to the outer side of said top wall forward portion, and side closure panels extending laterally from one of said interior walls folded forwardly to form side closure walls serving to retain said box structure in an erect operative position.

References Cited in the file of this patent

UNITED STATES PATENTS

| | | |
|---|---|---|
| 899,862 | Crocker et al. | Sept. 29, 1908 |
| 2,403,747 | O'Gorman | July 9, 1946 |
| 2,643,578 | Williams | June 30, 1953 |
| 2,690,698 | Dasch | Oct. 5, 1954 |
| 2,724,991 | Levine | Nov. 29, 1955 |
| 2,789,460 | Kaufman | Apr. 23, 1957 |